3,467,597
GRAFTED TERPOLYMERS, THEIR PROCESS OF PRODUCTION, AND USE AS ADDITIVES FOR LUBRICANTS AND FUELS

Norman Tunkel, Perth Amboy, and Harold N. Miller, Plainfield, N.J., assignors to Esso Research and Engineering Company, a corporation of Delaware
No Drawing. Filed Nov. 22, 1966, Ser. No. 596,104
Int. Cl. C10m 3/10; C101 1/16
U.S. Cl. 252—56                                    4 Claims

ABSTRACT OF THE DISCLOSURE

Terpolymers of ethylene, vinyl esters, and a monoolefinically unsaturated polymerizable compound grafted with ethylene are useful in hydrocarbon oils as pour depressants and flow improvers.

---

The present invention relates to the production of grafted terpolymers which are particularly useful as pour depressants and/or flow improvers for hydrocarbon oils and, most especially, are useful with respect to these properties in compositions of lubricating oils or petroleum middle distillates containing the same. The invention also relates to the novel process of producing such terpolymers and, more especially, is designed for the production of these terpolymers and their use in hydrocarbon fuels and lubricating oils in climates where low ambient temperatures are seasonably encountered.

Hydrocarbon oils including lubricants and petroleum middle distillates such as kerosene, #2 heating oil, diesel fuels, jet fuels, and other types of middle distillate fuels have, for many years, been treated with an additive or additives designed to inhibit or minimize the radical changes in physical characteristics of such oils depending, upon the variations in temperatures to which they are atmospherically or artificially subjected, particularly where they contain sizeable amounts of paraffinic or waxy ingredients. In order for a hydrocarbon fuel to be utilized effectively, it must have the property of being freely flowable through conduits both from the standpoint of conducting the same to the burner or carburetor by which means it is burned or combusted and at the same time it must exhibit the same free flowing property in handling, storage, transportation and the like. In regions where seasonable atmospheric temperatures are below 30° F., problems have been encountered in both of these respects. Oils which contain sizeable quantities of waxy components, i.e., paraffins, have a tendency to precipitate into large interlocking crystals which trap the fuel in a gel-like structure. This gel structure causes the fuel to solidify or tend to have a much higher viscosity such that, for all practical purposes, the fuel is nonpumpable and nontransportable. This gel condition is generally known as the pour point and arises largely by reason of the tendency of the wax crystals to form an interlocking network. In addition, wax particles tend to plug fuel filters and to increase the viscosity of the fuel as the ambient temperature decreases.

This problem has been recognized in the past and various additives have been suggested for the purpose of depressing the point at which the oil solidifies or becomes so viscous that its handling properties are seriously impaired. Such substances have in the past been termed pour depressants and, in general, their function has been to modify the crystallization and crystal growth of the waxy paraffinic components contained in such oils. For many years, lubricating oils have had their pour points drastically lowered through the addition of small amounts of these various pour point depressant type additives. More recently, fuel oils, diesel fuels, i.e., the middle distillate oil fractions, have likewise had various additives incorporated into their compositions for the purpose of not only lowering their effective pour points but also for the purpose of improving their pumpability or flowability in handling lines and in lines going from storage tanks to the points where such compositions are to be combusted. In almost all instances where such hydrocarbon products are conducted through pipes, filters are incorporated for the purpose of removing sediment or extraneous materials which per chance are associated with such oil fractions. These are necessarily of fine pore size so as to effectively remove fine particles from the oil fractions.

It is readily appreciated that while waxy components of such oil fractions remain in liquid form under moderate or elevated temperatures, the wax tends to crystallize when such oil compositions encounter low temperatures, i.e., of the order of 30° F. or below, which temperatures are common place in certain extremely northern or extremely southern geographical regions of the earth. It has been found that wax-containing oil fractions, either of the lubricating oil or of the middle distillate fuel type, are difficult to handle, difficult to conduct through pipes, and are most troublesome to use where temperatures around or below 30° F. are encountered.

Heretofore, various pour point depressants have been employed to overcome these difficulties. In particular, minor amounts, i.e., from 0.01 up to 5 wt. percent of a relatively low molecular weight copolymer of ethylene and vinyl acetate have been commercially and extensively employed to improve the handling of middle distillate oil fractions under atmospheric temperature conditions of 30 °F. or below. Many prior disclosures with respect to this development are known, among which are U.S. Patents 2,499,723, 2,654,188, 3,048,479 3,093,723, 3,126,364, and 3,236,612. Such ethylene-vinyl acetate copolymers, however, while they do act as pour depressants, do not completely solve the problems of handling wax-containing oil fractions under extremely low temperatures; particularly so where the ambient temperatures encountered coincide for extended periods of time with the cloud point temperatures of the particular oil fractions being handled. The transportation and movement of such oil fractions at temperatures at or near the cloud point of the particular oil fraction involved is believed to result in the initial formation of small wax crystal nuclei but if the temperature is maintained over a considerable period of time these initial crystalline nuclei have a tendency to grow forming large crystals and so the tendency is for the material to become troublesome in its transportation or its passage through oil lines. The continued growth of the initial crystalline nuclei at the oil's cloud point increases the viscosity of the oil markedly and thus requires the expenditure of far more energy to transport the fuel than would be the case if such initial crystals remained small and would not increase in size.

The novel grafted terpolymers of the present invention have been found effective in changing the size of the wax crystals which precipitate from the hydrocarbon oils, both initially and as the temperature is lowered, thus resulting in more crystals of much reduced size than in cases where these novel grafted terpolymers are not incorporated in such oils. The terpolymers themselves also effectively lower or depress the pour point of the wax-containing oil fractions whether of the lubricating oil type or of the middle distillate type but it has been found that the grafting of such terpolymers by means of the incorporation of ethylene into the terpolymer backbone structure tends to even further lower the pour point and/or the flowability characteristics of these petroleum fractions.

Copending applications, Ser. No. 522,341, filed Jan. 24, 1966, and now U.S. Patent 3,304,261 discloses and claims novel lubricating oil compositions containing terpolymer additives formed from ethylene, unsaturated aliphatic monocarboxylic acid esters of from 4 to 20 carbon atoms per molecule and unsaturated dicarboxylic acid diesters of saturated monohydric primary alcohols of 8 to 18 carbons per molecule reacted with alpha-beta unsaturated dicarboxylic acids and their anhydrides. Copending application, Ser. No. 561,029, filed June 26, 1966, entitled "Terpolymers, Their Process of Production and Use of Same," by Norman Tunkel and Darrell W. Brownawell, now abandoned, discloses and claims some of the novel terpolymers which serve as the starting materials for ethylene grafting embodied in the present novel products and their process of production. The disclosures contained in these two applications are incorporated herein by reference as a supplementary disclosure of the method of preparation and the identity of terpolymers which may be grafted with ethylene.

These terpolymers are prepared by terpolymerizing ethylene, an unsaturated aliphatic monocarboxylic acid ester of 4 to 20 carbon atoms per molecule such as a vinyl ester of a monocarboxylic acid containing from 2 to 18 carbon atoms per molecule and a mono-olefinically unsaturated polymerizable monomeric compound containing between about 4 and about 30 carbon atoms per molecule. These terpolymers are generally viscous, hazy, whitish liquids having number average molecular weights of between about 500 and about 50,000, preferably between about 2,000 and about 5,000. When incorporated into petroleum oil fractions, not only as good or better pour point depressant activity as has heretofore been obtained through the use of commercially available ethylene-vinyl acetate copolymers is attained, but, in addition, these terpolymers have been found to exhibit a marked enhancement of the flowability or pumpability characteristics of these oils at any point at or near the cloud point of the oils down to temperatures approaching the pour point of such compositions. The instant invention, however, is not limited to the terpolymers specifically disclosed in the above mentioned copending applications but is much broader in its application for it applies also to the ethylene grafting of other terpolymers as well.

Essentially, the preformed terpolymers onto which ethylene is grafted are produced by the terpolymerization of three polymerizable alpha-ethylenically unsaturated monomers. These monomers may be defined as follows:

(1) Ethylene, (2) An unsaturated aliphatic monocarboxylic acid ester of 4 to 20 carbon atoms, such as a vinyl ester of a fatty acid which acid contains from 2 to 18 carbon atoms per molecule, and (3) At least one mono-olefinically, unsaturated, polymerizable compound containing between about 4 and about 30 carbon atoms per molecule and which is other than a monomeric compound specifically selected from class 2.

Class 2 monomers are exemplified or typified by one or more of the following vinyl esters: vinyl acetate, vinyl propionate, vinyl butyrate, vinyl valerate, vinyl caproate, vinyl caprylate, vinyl laurate, vinyl palmitate, and vinyl stearate.

The monomeric components defined by class 3, supra, may be any one of a large variety of mono-olefinically, unsaturated (sometimes hereinafter referred to as ethylenically unsaturated), polymerizable compounds containing as few as 4 carbon atoms per molecule or as many as 30 carbon atoms per molecule. Many types of such compounds are contemplated. For example, alpha-mono-olefins may be employed which olefins may be mixtures of such olefins or single compounds selected from the following: The butylenes, amylenes, hexenes, heptenes, octenes, nonenes, decenes, dodecenes and mono-olefins containing larger numbers of carbon atoms per molecule.

More specifically, the following compounds or mixtures thereof are contemplated: decene-1, dodecene-1, tetradecene-1, hexadecene-1, heptadecene-1, octadecene-1, eicosene-1, heneicosene-1, docosene-1, tetracocene-1, hexacocene-1, octococene-1.

A second type of polymerizable monomer compound serving as the third monomer to be terpolymerized is an unsaturated monocarboxylic acid such as acrylic, methacrylic, citraconic, mesaconic, itaconic and aconitic acid.

Still another type falling within the class 3 category are the $C_1$ to $C_{18}$ mono- and di-alkyl esters of mono-olefinically unsaturated mono- and di-carboxylic acids, their anhydrides and the free (unesterified) acids and anhydrides. These materials are exemplified by the following specific compounds: diethyl maleate, diethyl fumarate, dodecyl maleate, dodecyl fumarate, maleic acid, fumaric acid, maleic anhydride, diethyl citraconate, ditetradecyl fumarate, ditetradecyl maleate, lauryl methacrylic acid, lauryl methacrylate, butyl methacrylate, methyl methacrylate, glycol dimethacrylate, dodecyl methacrylate, octodecyl methacrylate, lauryl acrylate, methyl acrylate, amyl acrylate, ethyl acrylate, dodecyl acrylate, octodecyl acrylate, $diC_{13}$ oxo fumarate.

A large number of these useable mono and diesters of unsaturated mono- and di-basic acids may be represented by the formula:

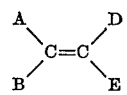

wherein A and D are COOR and B and E are hydrogen; wherein A and D are COOR and B and E are either hydrogen or methyl; wherein A and B are hydrogen D is COOR and E is a methylene carboxylic acid ester; wherein A and D are COOR E is methylene carboxylic acid ester and B is hydrogen.

In all cases, R is an alkyl group, either normal or branched chain, or a cycloalkyl group. In all cases, R contains from 1 to 18 carbon atoms. The esters are conventionally formed by using the selected acid or its anhydride and reacting the same in conventional manner with the desired alcohol either to give a partial or a complete esterification of the carboxyl groups. Benzene sulfonic acid and other conventional catalysts may be employed. The formation of the ester is well known and many of the aforementioned ester compounds are commercially available on the market. The present invention does not reside in the formation of the ester compounds but only in their use.

Representative specific terpolymers are formed by reacting the three monomers in suitable proportions. Such terpolymers may be represented as being formed from, for example, the following:

ethylene-vinyl acetate-tetradecene-1,
ethylene-vinyl acetate-$C_{13}$ oxofumarate,
ethylene-vinyl acetate-$C_{14}$ to $C_{16}$ alpha-olefin mixture,
ethylene-vinyl acetate-diethyl fumarate,
ethylene-vinyl acetate-diethyl maleate,
ethylene-vinyl acetate-methylmethacrylate,
ethylene-vinll acetate-methacrylic acid,
ethylene-vinyl acetate-acrylic acid,
ethylene-vinyl propionate-methylmethacrylate,
ethylene-vinyl propionate-diethyl fumarate,
ethylene-vinyl acetate-lauryl methacrylate,
ethylene-vinyl stearate-lauryl methacrylate,
ethylene-vinyl acetate-di-dodecyl fumarate,
ethylene-vinyl acetate-dodecyl methacrylate,
ethylene-vinyl acetate-cyclohexyl methacrylate,
ethylene-vinyl acetate-ethyl acrylate,
ethylene-vinyl acetate-cyclohexyl acrylate,
ethylene-vinyl acetate-lauryl acrylate,
ethylene-vinyl acetate-divinyl ether,
ethylene-ethylacrylate-didodecyl fumarate,
ethylene-methylmethacrylate-$diC_{13}$ oxo-fumarate The formation of the terpolymers is carried out in an autoclave or pressure vessel, usually a stainless steel pressure vessel equipped with a stirrer. Ordinarily, the terpolymerization takes place in a liquid reaction medium employing an organic hydrocarbon as a solvent. The preferred solvent is benzene. However, hexane, heptane, cyclohexane, toluene, or any non-reactive hydrocarbon solvent may be employed. Sufficient superatmospheric pressures are employed so that a liquid phase medium is maintained under the reaction conditions obtaining. In general, the pressure is attained and maintained on the reaction zone through the continuous application of ethylene to the reactor during the reaction. The reactor is charged with solvent and then brought up to pressure and maintained at pressure throughout the reaction by means of ethylene. Either one or both of the other termonomers are simultaneously charged to the reaction vessel. The reaction is carried out through the use of one of the free radical type catalysts or promoters which are commercially available. The temperature is generally maintained between about 110° F. and about 500° F., preferably between about 175° F. and about 300° F. depending on the choice of free radical initiator. The pressure during the reaction may vary considerably, for example, between about 400 p.s.i.g. and about 15,000 p.s.i.g., preferably between about 1000 and about 6000 p.s.i.g. From the standpoint of ready availability, the catalysts most generally employed are of the organic peroxide type but the invention is not limited to the use of any particular peroxide. Typical suitable peroxides which may be used are: benzoyl peroxide, ditertiary butyl peroxide, dicumyl peroxide, tertiary butyl perbenzoate, lauryl peroxide, azo-bis-isobutyronitrile, or any other suitable commercially available peroxide. The peroxide is generally employed in the reaction mixture to the extent of between about 0.05 and about 1.5 wt. percent of the reaction mixture. Amounts outside of this range may be employed. In general, the catalyst is added to the reactor in the form of a pre-solution of the catalyst in the solvent which forms the liquid reaction medium. The reaction is carried out for about ½ to about 6 hours, preferably between about 3 hours and about 4½ hours.

At the conclusion of the formation of the terpolymer, the reactor contents may be dumped and the pressure reduced thereon with the resultant vaporization or flashing off of the unreacted reactants which are volatile under the reduced pressure and by distillation either under vacuum or atmospheric pressure to further rid the reacted mixture of the unreacted monomers which may be present, after which the terpolymer may be redissolved in the same or a different solvent, pressured up to the same or a different superatmospheric pressure. Further quantities of ethylene with further amounts of the same or a different peroxide promoter as used in forming the original terpolymer are then introduced in order to effect the ethylene grafting operation. In general, the ethylene, which materially increases the branchiness of the previously preformed substantially linear polymer backbone is maintained in excess and under a constant pressure within the range previously mentioned for forming the terpolymer. The ethylene grafting is usually conducted at a temperature between about 110° F. and about 500° F., preferably between about 175° F. and about 300° F., for between about ½ hour and about 6 hours, preferably between about 3 hours and about 4½ hours, under a pressure of between about 400 p.s.i.g. and about 12,000 p.s.i.g. This generally results in an increase in molecular weight and viscosity resulting from the increased branchiness. The pour point depressant potency and/or flowability potency been found to be materially increased when the terpolymers are grafted with ethylene.

Alternatively, it has been found that there is no need to recover the terpolymer from its reaction mixture prior to the conducting of the ethylene grafting process. All that is necessary, and which is likewise commercially convenient, is that the class 2 and class 3 monomers be no longer added to the reaction mixture while ethylene and the peroxide free radical type catalyst are continued to be added to the reaction mixture. This equally well results in effective grafting of ethylene onto the preformed terpolymer.

The relative amounts of monomer present in the terpolymer vary considerably depending upon the reaction conditions and upon the relative amounts of class 2 and class 3 polymers used. In both the grafting operation and in the terpolymer formation process, excesses of ethylene are employed for it is by this means that the superatmospheric pressures are maintained on the reaction. The terpolymer, therefore, will contain from 40 to 60 wt. perecent of ethylene, from 15 to 45% of vinyl acetate or other vinyl ester (class 2 monomer), and from 5 to 35% of class 3 monomer.

The saponification number of the ungrafted terpolymer may range between about 100 and about 300. This is a rough indication of the amount of the class 2 and class 3 monomers contained in the terpolymer. Similarly, the saponification number of the ethylene grafted terpolymer generally ranges between about 100 and about 200 and, likewise, will constitute a measure of the class 2 and class 3 monomers contained in the grafted terpolymer. The saponification number of the grafted polymer will always be substantially lower than that of the ungrafted, reflecting the increase in the amount of ethylene in the polymer.

In general, the petroleum oil fractions to which these terpolymers are added constitute the hydrocarbon middle distillate fuels such as kerosone, #2 heating oil, diesel fuel oil, and, in some instances, jet fuels such as No. 2 or No. 4. The improved characteristics heretofore defined and resulting from the addition of these terpolymers are also exhibited when such terpolymers are added to lubricating oil fractions. In general, the middle distillate fuels have a boiling range between about 250° F. and about 800° F. while the lubricating oil fractions have boiling ranges between about 650° F. and about 1,100° F. The quantities of these additives which are employed or incorporated into such oil fractions may vary widely but generally they are added in about the same quantities that pour depressants have heretofore been added, namely, between about 0.005 and about 5.0 wt. percent, preferably between about 00.1 and about 2.0 wt. percent.

These additives may be employed alone or in combination with other well known additives for hydrocarbon fuel oils or lubricating oils such as other pour depressants, e.g., the commercially available ethylene-vinyl acetate copolymers or other commercially available pour point depressants, viscosity index improvers, corrosion inhibitors, antioxidants, and the like. Among such viscosity index and pour point agents, may be mentioned the high molecular weight polymeric "Acryloids" and "Paraflow," i.e., chlornated wax-naphthalene condensation products, isobutylene polymers, ethylene-styrene copolymers and the like. The corrosion inhibitors are those customarily employed such as the inorganic or organic nitrites, for example, sodium nitrite or lithium nitrite, diisopropyl ammonium nitrite or dicyclohexyl ammonium nitrite, the metallic organic phosphates, for example, calcium or zinc dicyclohexylthiophosphate or the same salts of methylcyclohexylthiophosphate; anti-oxidants such as the commercially available and conventionally used phenols and amines such as octadecylamine, 2,6-di-tertiarybutyl-4-methyl phenol; or even in association with the extreme pressure additives such as the conventional organic phosphites and phosphates.

In the following examples, aliquots of the terpolymers or the grafted terpolymers, in the amounts therein indicated, were incorporated into various middle distillate fuels and lubricating oils for determining their effectiveness in depressing the pour point and/or in improving the flowability at various low temperatures. The pour point determinations were performed in accordance with ASTM method D-97. The sample is cooled systematically under quiescent conditions and observed at intervals of 5° F. of temperature lowering. The pour point is the lowest temperature at which the oil flows when the container is tilted.

The other test referred to in the following examples is the Flow and Plugging Test. About 3,600 cc. of the oil composition to be tested is cooled to the desired test temperature in a one gallon container over a period of from 5 to 8 hours and is then held at that temperature for an additional 10–20 hours. The oil composition containing the additive is then drawn through a copper tube having a flared inlet and of $\frac{3}{16}$" outside diameter and about 150 centimeters long. This is accomplished by applying a vacuum of 5 inches of mercury on the outlet end. The internal diameter of the copper tubing is $\frac{1}{8}$" but in the inlet end of the copper tubing there is a perforated disk having a single hole of $\frac{1}{16}$" diameter. To pass the test, the oil composition must have 90% or more of its total volume pass through the $\frac{1}{16}$" diameter hole before wax plugs the opening. If less than 90% passes through the disk orifice with more than one plugging of wax during or at the end of the test, it is considered that the oil tested failed. The tests are started with the oil composition near the cloud point and are lowered by 5° F. for each subsequent test. The results given in the following examples indicate whether or not the fuel composition passed the test by delivering 90% or more of the total amount of oil. Compositions subjected to this test, conducted at temperatures of 5° F. intervals lower from test to test, were considered to be failures at any temperature at which two or more wax pluggings occurred. The test is designed to measure the flowability or the pumpability of wax-containing distillate oil fractions from a point at or near the cloud point down to temperatures approaching the pour point temperature.

The cloud point temperature is defined as that temperature at which the first sign of crystalline material appears when cooled under conditions specified in ASTM D–97. In the following examples, a high cloud point and a low cloud point No. 2 fuel oil have been used as the base stocks to which the terpolymers and grafted terpolymers have been added and tested for comparative purposes. These fuel oils have the following inspections:

|  | A | B | C |
| --- | --- | --- | --- |
|  | High Cloud Point | Low Cloud Point | High Cloud Point |
|  | 50% cracked cycle oil; 50% straight run naphtha | 50% cracked cycle oil; 50% straight run naphtha | 50% cracked cycle oil; 50% straight run naphtha |
| Cloud point, ° F | +20 | +8 | +18 |
| Pour point, ° F | +20 | 0 | +15 |
| A.P.I. gravity | 31.2 | 32.7 | 32.0 |
| Distillation: |  |  |  |
| Initial Boiling Point, ° F | 364 | 346 | 340 |
| 5% | 418 | 392 | 424 |
| 50% | 535 | 482 | 530 |
| 95% | 635 | 620 | 635 |
| Final Boiling Point, ° F | 644 | 628 | 654 |
| Aniline point | 134 | 127 | 129.5 |
| Viscosity at 100° F., Centistokes | 3.35 | 2.224 | 3.35 |

The following examples are given as illustrations of the invention but it is not intended that the invention be limited thereby.

Example 1

A stainless steel autoclave equipped with a stirrer was charged with 1,070 cc. of benzene. Ethylene was pressured into the reaction vessel to a pressure of 1,150 p.s.i.g. The automatic pressure regulator apparatus employed was so arranged that when the pressure dropped by 100 p.s.i.g. additional ethylene was added automatically so that the pressure was brought back up to 1,150 p.s.i.g. During the course of the reaction this happened 19 times. The temperature of the reaction medium was maintained at about 300° F. 160 cc. per hour of a solution containing 80% vinyl acetate and 20% of a $C_{14}$ to $C_{18}$ 1-olefin mixture was added over a period of 2 hours and 15 minutes. Simultaneously with this addition there was added at the rate of 25 cc. per hour, a 23% concentration of ditertiary butyl peroxide in benzene. This was added also for an additional 15 minutes beyond the 2 hours and 15 minutes for a total of 2½ hours but no additional vinyl acetate or long chain olefin was added during this additional 15 minutes. After an additional 15 minutes of heating during which the ethylene input had slowed sufficiently, i.e., a constant pressure was reached, the reaction was terminated, the reactor was cooled, depressurized, and the product stirpped in a steam bath. 616 grams of terpolymer, which was a viscous liquid, was recovered. It had a saponification value of 206 which corresponds to a vinyl acetate content of 32%. When diluted to 45 weight percent in kerosene, the polymer had a kinematic viscosity of 89.9 seconds at 100° F. This is a measure of the weight average molecular weight. Fuel Oil C, a high cloud point fuel oil, had added thereto 0.03 wt. percent (0.06 wt. percent as a 50% conc. in kerosene) of this terpolymer but this failed to pass the Flow and Plugging Test previously described.

Example 2

A further terpolymer was prepared using the same procedure, reactants and reaction conditions as shown in Example 1 except that the olefin employed was a mixture of $C_{14}$ and $C_{16}$ 1-olefin mixture in approximately 50%–50% amounts. There were recovered 855 grams of a viscous liquid having a number average molecular weight of 2,230. The terpolymer had a saponification number of 287 which indicated a vinyl acetate content of about 44%. In the same test fuels and using the same amounts as described in Example 1, the pour point in the low cloud point fuel was −30° F. and in the high cloud point fuel oil the admixture, with this terpolymer, failed to pass the Flow and Plugging Test.

Example 3

This run was carried out in the same manner as described in Example 1 using the same three monomeric reactants, procedure and using the same reaction conditions except that in place of the $C_{14}$–$C_{18}$ 1-olefinic mixture as one of the reactants a like amount of a $C_{13}$ oxo fumarate (obtained by esterifying fumaric acid with a $C_{13}$ oxo alcohol) was substituted and the catalyst solution was added at the increased rate of 30 cc. per hour. This produced 510 grams of a viscous liquid having a viscosity of 83.1 seconds at 100° F. when diluted to 45 weight percent in kerosene. The viscous liquid terpolymer had a saponification number of 160.7. This terpolymer at 0.02 wt. percent gave a −30° F. pour point in the low cloud point fuel B and did not pass the Flow and Plugging Test, when employed in the high cloud point fuel A, at 0.03 wt. percent addition. Examples 1, 2 and 3 are intended to show the manner of preparation of ungrafted terpolymers which are then subjected to conditions of ethylene grafting in accordance with the conditions of the examples which follow.

Example 4

The procedure of Example 2 was repeated up until the lapsing of 2 hours and 15 minutes at which time the addition of olefin and vinyl acetate was shut off. The peroxide solution, however, was continued for an additional 2 hours and 15 minutes of heat soaking time while maintaining a constant pressure of ethylene on the reactant. Throughout the entire reaction time, i.e., during the addition of vinyl acetate and olefin and during the addition only of the peroxide solution and ethylene, 31 separate additions of 100 p.s.i. each were required to bring the pressure back to 1,150 p.s.i.g. and to maintain that pressure. 890 grams of viscous liquid was obtained having a number average molecular weight of 2732 and a saponification number of 203. Both the molecular weight and saponification number reflect an increase in the number of hydrocarbon branches resulting from the ethylene grafting.

Upon addition of 0.02% of this grafted polymer to the low cloud reference fuel B, a pour point of —55° F. was obtained. This can be compared to —30° F. for a like amount of the ungrafted terpolymer of Example 2.

Example 5

The procedure, reactants, and conditions of Example 3 was repeated up until the 2 hours and 15 minutes of reaction time had been attained, at which time no further amounts of vinyl acetate and ester were introduced. The peroxide solution was continued for an additional 2 hours and 15 minutes at the rates specified in Example 1 and ethylene pressure was maintained intermittently for the total time at 1,150 p.s.i.g. 958 grams of viscous liquid having a kinematic viscosity of 217.8 sec. at 100° F. when diluted to 45% in kerosene and a saponification number of 127.8 was obtained. Both the viscosity and sanonification number reflect the increased ethylene content of the terpolymer. The same amounts of this ethylene grafted terpolymer were employed as described in Example 1 in reference fuel B resulting in a —30° F. pour point for the low cloud point fuel and in a passage of the Flow and Plugging Test in the high cloud point fuel, A, using 0.03% of grafted terpolymer.

The ethylene grafted terpolymer of Example 5 passed the Flow and Plugging Test using high cloud point fuel oil but the same ungrafted terpolymer of Example 3 failed the Flow and Plugging Test using the same fuel oil.

The increase in viscosity (where noted) and molecular weight (again, where noted) and the reduced saponification number are evidence of substantive increase in molecular weight and ethylene to ester mole ratios. In Examples 2 and 4, and 3 and 5, the result of ethylene grafting is to increase the wax crystal modifying properties of the base polymers (Examples 2 and 3) such that the grafted terpolymer of Example 4 is a better pour depressant and the grafted terpolymer of Example 5 is a better flow improver.

Having set forth the general nature and specific embodiments of the present invention, what is desired to be secured by Letters Patent is:

1. A petroleum hydrocarbon oil containing as a pour point depressant about 0.005 to 5 wt. percent of an ethylene grafted terpolymer of 850 to 20,000 molecular weight, said terpolymer comprising about 40 to 60 wt. percent ethylene, about 15 to 45 wt. percent of vinyl alcohol ester of $C_2$ to $C_{18}$ fatty acid and about 5 to 35 wt. percent of a $C_4$ to $C_{30}$ alpha monoolefin, said terpolymer before grafting having a number average molecular weight in the range of about 500 to 50,000, which terpolymer is grafted with ethylene in the presence of a continuously added free radical polymerization promoter at a pertaure between 100° F. and about 500° F. under ethylene pressure of 400 to 15,000 p.s.i.g. for a time of about ½ to 6 hours.

2. A hydrocarbon oil according to claim 1, wherein said oil is a distillate fuel oil, said vinyl alcohol ester is vinyl acetate and wherein said terpolymer is grafted with ethylene for about 2¼ hours.

3. An oil according to claim 1, wherein said oil is a distillate fuel oil and said vinyl alcohol ester is vinyl acetate.

4. An oil according to claim 3, wherein said monoolefin is tetradecene-1.

References Cited

UNITED STATES PATENTS

| | | | |
|---|---|---|---|
| 3,304,261 | 2/1967 | Ilnyckyj et al. | 252—56 |
| 3,341,309 | 9/1967 | Ilnyckyj | 44—62 |

DANIEL E. WYMAN, Primary Examiner

W. CANNON, Assistant Examiner

U.S. Cl. X.R.

44—62, 66, 70; 260—878